May 3, 1927.
J. F. PANYARD
PISTON PACKING
Filed Aug. 28, 1925
1,626,749
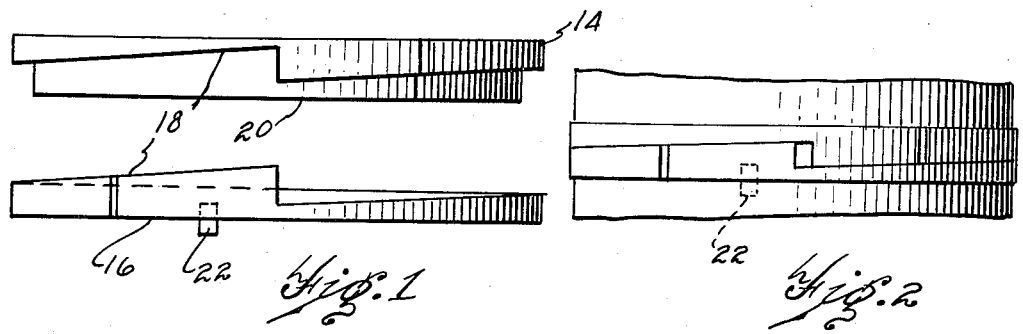
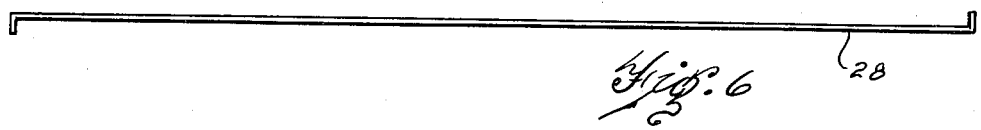
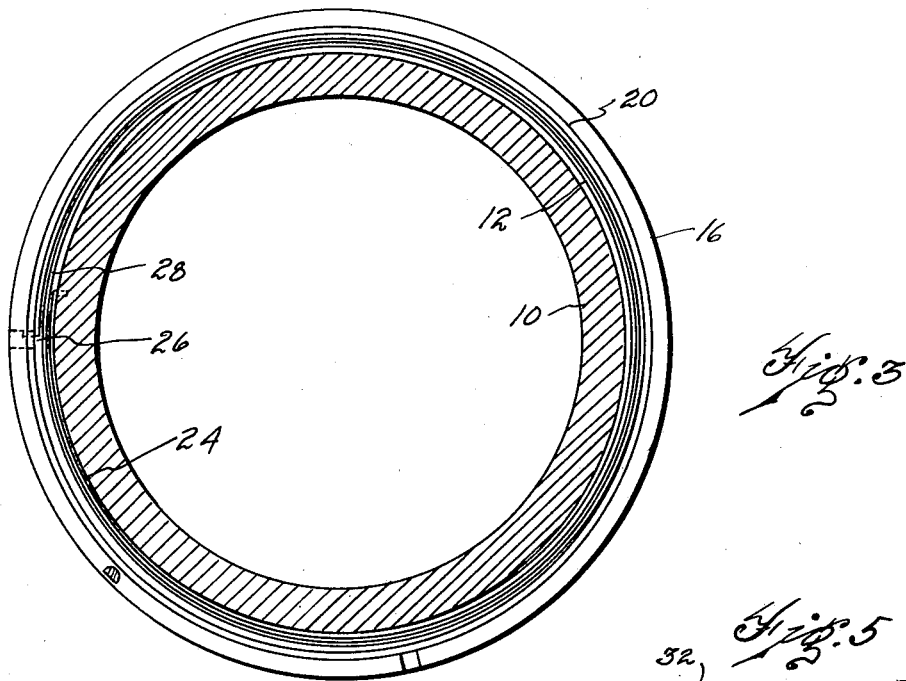
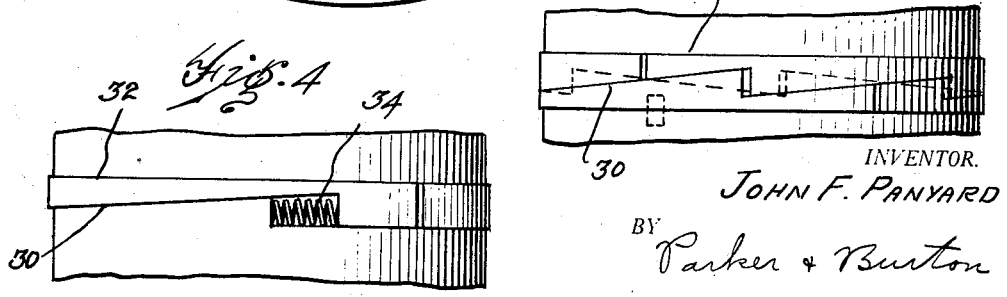
INVENTOR.
JOHN F. PANYARD
BY Parker & Burton
ATTORNEY.

Patented May 3, 1927.

1,626,749

UNITED STATES PATENT OFFICE.

JOHN F. PANYARD, OF DETROIT, MICHIGAN.

PISTON PACKING.

Application filed August 28, 1925. Serial No. 53,018.

My invention relates to improvements in piston packing. This application is a continuation in part of my application Serial No. 601,685, which was a division of my earlier application Serial No. 566,875.

The object is to provide an improved piston packing to seal the joint formed with the cylinder and with the side walls within which the packing is disposed without exerting undue pressure against the cylinder wall.

An object of my improvement is the provision in a piston of a packing groove having a stationary helical side wall and fitted with a packing ring having a meeting helical face held under rotatable pressure to wedge the ring within the groove and to hold the ring outwardly against the cylinder wall.

As it is customary to provide pistons with parallel straight side packing grooves, I have shown my improvement as comprising a pair of co-operating expansible split piston rings having helical meeting faces, one of which rings is anchored within the groove in the piston, the other ring being rotatable therein and held under tension counter the stationary helical face within the groove to be wedged thereagainst.

An important advantage has been found to reside in providing one of the co-operating rings with a base flange of substantially the width of the bottom of the groove and seated therein which stabilizes the ring against rockable movement within the groove and serves as a seat for the co-operating ring section which in turn may be anchored against rotation.

A convenient and satisfactory means of imparting rotatable pressure to the rotatable ring section is through the employment of a flat spring coiled about the piston at the bottom of the groove and turned up at one end into the split of the rotatable ring section and anchored at the other end to the piston, which may be accomplished by locating such end in a notch in the bottom of the ring groove. An alternative and effectual device is to provide a coil spring such as also shown in the drawing. Obviously the ring sections may have a plurality of helical meeting faces or be provided with merely a pair of helical meeting faces.

Other advantages and distinctive features will more fully appear from the following description, appended claims and accompanying drawing, in which:

Figure 1 is an elevation of a preferred form of my packing showing the ring sections separated from each other.

Fig. 2 is a side elevation of a fragment of a piston provided with the ring sections shown in Fig. 1.

Fig. 3 is a horizontal sectional view through a piston showing my packing in position in the groove.

Fig. 4 is a fragmentary side elevation of a piston fitted with one form of my packing.

Fig. 5 is a similar fragmentary side elevation of a piston fitted with a modified form of my packing.

Fig. 6 is an elevation of a suitable spring member.

In the drawings, let 10 indicate a piston provided with a suitable packing groove 12 within which is disposed my improved packing. Figs. 2, 3 and 5 illustrate my packing in connection with a groove in the piston having parallel straight sides and in which I employ two co-operating ring sections. One ring section is indicated as 14, the other ring section as 16. These sections are split expansible ring sections having meeting helical faces 18. Ring section 14 has a base flange 20 substantially the width of the bottom of the groove and seated therein. Ring section 16 is seated upon this base flange 20 of ring section 14.

One of these ring sections is anchored against rotation within the groove and I have here shown ring section 16 as being so anchored by means of a pin 22. Ring section 14 is held under rotatable pressure counter the stationary helical face of ring section 16.

A convenient and effectual means for exerting rotatable pressure on ring section 14 is through the employment of a flat spring 24 coiled upon itself about the piston in the bottom of the groove. This spring is turned up at one end as at 26 into the split of ring section 14 to urge the same rotatably and is anchored at the opposite end to the piston. It may be anchored through locating a turned-down end portion 28 in a suitable notch in the piston, as shown in Fig. 3.

In Fig. 4, I have shown a modified form of construction in which the packing groove in the piston is so cut as to have a helical side wall 30 which co-operates with a helical face on the single packing ring 32 located therein, which ring is held under rotatable pressure to wedge the helical meeting faces together. A suitable means for exerting rotatable pressure on the ring is to employ a helical expansion spring 34, one end of which abuts the shoulder on the ring and the other end engages the shoulder of the packing ring groove.

In Fig. 5, I have shown packing rings similar to the rings described in Figs. 1, 2 and 3, one of which rings is anchored in the groove and the other held under rotatable pressure, but the rings shown in Fig. 5 are provided with a plurality of helical meeting faces.

What I claim is:

1. In piston packing, a piston having a groove for packing provided with a helical side wall, a packing ring having a meeting helical face rotatably mounted therein and held under rotatable pressure to wedge its helical face against the helical side wall of the groove.

2. In piston packing, a piston having a groove for packing provided with a helical side wall, a split expansible packing ring having a helical meeting face rotatably mounted within the groove, and a spring engaging the piston and ring to exert rotatable pressure on the ring counter the helical face of the groove.

3. In piston packing, a piston having a groove for packing provided with parallel straight sides, packing in said groove comprising a pair of cooperating ring sections having helical meeting faces, one section anchored against rotation within the groove, the other section held under rotatable pressure to be wedged therein against the anchored section.

4. In piston packing, a piston having a groove for packing, packing in said groove comprising a pair of split expansible ring sections having helical meeting faces, one section being substantially L-shaped in cross section and having a base flange disposed within the bottom of the groove, said other section seated upon the base flange of the first section, one of said sections being anchored to the piston against rotation, the other section being held under rotatable pressure counter the helical face of the anchored section.

5. In piston packing, a piston having a groove for packing, packing in said groove comprising a pair of split expansible ring sections having helical meeting faces, one section being substantially L-shaped in cross section and having a base flange disposed within the bottom of the grove and being approximately the width thereof, said other section seated upon the base flange of the first section and anchored against rotation within the groove, spring means engaging the L-shaped section to exert rotatable pressure thereon counter the helical face of the anchored section.

6. In piston packing, a piston having a groove for packing, packing in said groove comprising a pair of split expansible ring sections having helical meeting faces, one section being substantially L-shaped in cross section and having a base flange disposed in the bottom of the groove and being approximately the width thereof, said other section seated upon the base flange of the first section and anchored against rotation within the groove, a spring coiled about the piston in the bottom of the groove underneath the first section and anchored at one end to the piston and turned up at the opposite end into the split of the first section to exert rotatable pressure thereon counter the helical face of the anchored section.

7. In piston packing, a piston having a groove for packing, packing in said groove comprising a split rotatable ring section having a helical lateral face, said groove having a meeting helical side wall, and a spring anchored to the piston and turned up at one end into the split of the rotatable ring section to urge the same against the helical face of the groove.

8. In piston packing, a piston having a groove for packing, packing in said groove comprising a pair of split expansible ring sections having helical meeting faces, one section anchored against rotation within the groove, the other section being rotatable therein, a flat spring coiled about the piston in the bottom of the groove anchored at one end thereto and engaged at the opposite end in the split of the rotatable ring section to wedge the same against the anchored section.

9. The invention as described in claim 7 wherein the spring is turned downwardly at the opposite end into a recess in the piston to be anchored thereto.

In testimony whereof, I sign this specification.

JOHN F. PANYARD.